United States Patent Office 3,101,348
Patented Aug. 20, 1963

3,101,348
PRODUCTS OF THE REACTION OF DIALKYL KETENES WITH DIHYDROPYRANS
James C. Martin, Kingsport, Tenn., assignor to Eastman Kodak Company, Rochester, N.Y., a corporation of New Jersey
No Drawing. Filed Aug. 26, 1960, Ser. No. 52,029
9 Claims. (Cl. 260—345.2)

This invention relates to certain novel chemical compounds, namely, the 2-oxa-8,8-dialkylbicyclo[4.2.0]octan-7-ones, and derivatives thereof and to the method of preparation of such compounds.

The new compounds of the invention are prepared by the reaction of dialkyl ketenes with dihydropyrans. The following general equation illustrates the reaction:

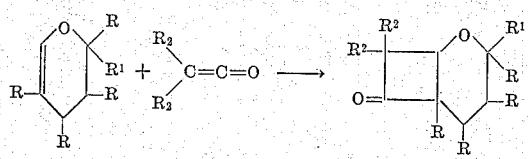

In the above equation R is hydrogen or an alkyl group having from 1 to 4 carbon atoms; $R^1$ is hydrogen, —CHO, or —OR; and $R^2$ is an alkyl group of from 1 to 4 carbon atoms or hydrocarbon groups which together with the carbon atom of the four-member ring to which they are attached, form a carbocyclic ring of 5 to 6 carbon atoms.

The reaction between the ketene and the dihydropyran can be carried out using substantially equimolar quantities of each reactant. However, it is advantageous to use excess dihydropyran, since this tends to minimize the side reaction of ketene dimerization. Reaction temperatures from 0° C. to 150° C. can be used, the higher temperatures being preferred for the less reactive intermediates. The reaction can be carried out with or without solvents. Suitable solvents are those that function as solvents for the reactants and the products but do not react with either. Typical solvents are: aliphatic esters, ethers, chlorinated aliphatic hydrocarbons, nitriles, and aliphatic and aromatic hydrocarbons. After completion of the reaction the novel compounds of the invention are separated from the solvent, unconverted reactants, etc., by distillation.

Ketenes that can be used in the method of the invention are indicated by the reaction equation above; namely, compounds of the structure, $(R)_2C=C=O$, wherein the substituents, R, are alkyl groups of 1 to 4 carbon atoms or are hydrocarbon groups which, with the carbon atom to which they are attached, form a 5 or 6 membered carbocyclic ring. Examples include diamethylketene, ethylmethylketene, diethylketene, butylethylketene, di-n-propylketene, diisobutylketene, di-n-butylketene, and carbocyclic ketenes such as tetramethyleneketene and pentamethyleneketene. The ketenes can be prepared by the method described in copending application of Hasek et al., Serial No. 841,961, filed September 24, 1959.

Dihydropyrans suitable for the method of the invention are also indicated by the equation above and have the general formula:

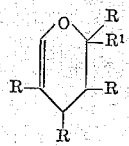

wherein R is hydrogen or a $C_1$ to $C_4$ alkyl group and $R^1$ is hydrogen, —CHO or —OR. Examples include dihydropyran, 3,4-dihydro-2H-pyran-2-carboxaldehyde, 3,4-dihydro-2,5-dimethylcarboxaldehyde, 3,4-dihydro-2-ethoxy-2H-pyran, 3,4-dihydro-2-ethoxy-5-methyl-2H-pyran, and 3,4-dihydro-2-ethoxy-4-methyl-2H-pyran.

The novel ketones of the invention are useful mainly as chemical intermediates which lead to various products of important utility. One such use consists of hydrogenating the novel ketone to form the corresponding alcohol and preparing an ester of the alcohol and a carboxylic acid, such as azelaic acid. The resulting esters are valuable as plasticizers for various polymer compositions. Another use of the novel ketones consists of reacting the new compounds with an aromatic diamine, such as a p-phenylene diamine, and hydrogenating the resulting di-Schiff's base to an N,N'-substituted p-phenylenediamine. The resulting compounds are valuable as antioxidants for organic materials such as gasoline and rubber.

The following examples illustrate the preparation of the novel ketones of the invention.

Example 1

Into a solution of 252 g. (3 moles) of freshly distilled dihydropyran in 1000 ml. of ether was passed approximately 2 moles of dimethylketene over a period of one hour. The reaction solution was stirred for 3 days at room temperature. Distillation of the reaction solution through an 18 in. packed column yielded 99.8 g. (1.18 moles) of recovered dihydropyran and 224.3 g. (80%) of 2-oxa-8,8-dimethylbicyclo[4.2.0]octan-7-one; boiling point, 89–90° C. (11 mm.); $n_D^{20}$, 1.4632. *Analysis.*— Calculated for $C_9H_{14}O_2$: C, 70.2; H, 9.1. Found: C, 70.4; H, 9.1.

Example 2

About 2 moles of ethylmethylketene was added over a period of 1 hour to 252 g. (3 moles) of dihydropyran. The reaction solution was stirred for 6 hours and maintained at 20–25° C. by means of a water bath. Distillation of the reaction solution through an 18 in. packed column gave 1.1 moles of recovered dihydropyran and 246 g. (71%) of 2-oxa-8-ethyl-8-methyl-bicyclo[4.2.0]-octane-7-one, boiling point, 96–97° C. (11 mm.). *Analysis.*—Calculated for $C_{11}H_{18}O_2$: C, 72.5; H, 9.9. Found: C, 72.4; H, 9.9.

Example 3

Into a solution of 384 g. (3.0 moles) of 3,4-dihydro-2-ethoxy-2H-pyran in 1000 ml. of benzene was passed approximately 105 g. (1.5 moles) of dimethylketene over a period of 1 hour. The reaction temperature was kept at 25–30° C. by means of a water bath. The reaction solution was allowed to stand at room temperature for 20 hours. Analysis by gas chromatography showed unreacted 3,4-dihydro-2-ethoxy-2H-pyran, dimethylketene dimer and a large peak attributed to the product. Distillation of the reaction solution through an 18-in. packed column gave 230 g. (1.8 moles) of unreacted 3,4-dihydro-2-ethoxy-2H-pyran, some 2,2,4,4-tetramethyl-1,3-cyclobutanedione, and 198.0 g. (85% yield based on 3,4-dihydro-2-ethoxy-2H-pyran consumed in the reaction) of 3-ethoxy-2-oxa-8,8-dimethylbicyclo[4.2.0]octan-7-one, boiling point 116° C. (13 mm.). This material solidified rapidly. An analytical sample was recrystallized from ethanol to give a product melting at 55° C. *Analysis.*— Calculated for $C_{11}H_{18}O_3$: C, 66.7; H, 9.1. Found: C, 66.5; H, 9.2.

Example 4

According to the manner described in Example 3, 14.2 g. (0.1 mole) of 3,4-dihydro-2-ethoxy-4-methyl-2H-pyran in 150 ml. of benzene was allowed to react with about 0.1 mole of dimethyl-ketene. There was obtained a 64% yield of 3-ethoxy-2-oxa-6,8,8-trimethylbicyclo[4.2.0]octan-7-one, boiling point 121° C. (13 mm.).

The following examples illustrate the preparation of valuable derivatives of the novel ketones and uses of such derivatives.

Example 5

A solution of 80 g. (0.52 mole) of 2-oxa-8,8-dimethylbicyclo[4.2.0]octan-7-one, as prepared in Example 1, in 250 ml. of ethanol was hydrogenated over 10 g. of 5% ruthenium on carbon in a stainless steel autoclave at 100° C. and 3,000 p.s.i. of hydrogen pressure. After the autoclave was cooled and vented, the contents were filtered to remove the catalyst. The filtrate was distilled through an 18-inch packed column to give 67.2 g. (83%) of 2-oxa-8,8 - dimethylbicyclo[4.2.0]octan - 7 - ol, boiling point 100–103° C. (10 mm.), $n_D^{20}$ —1.4822. *Analysis.*—Calculated for $C_9H_{16}O_2$: C, 69.2; H, 10.3. Found: C, 69.3; H, 10.3. The 3,5-dinitrobenzoate of this alcohol was prepared by the usual methods and melted at 131–133° C. *Analysis.*—Calculated for $C_{16}H_{18}N_2O_7$: C, 54.8; H, 5.2; N, 8.0. Found: C, 54.7; H, 5.0; N, 7.7.

Example 6

A mixture of 94 g. (0.5 mole) of azelaic acid, 170 g. (1.09 moles) of 2-oxa-8,8-dimethylbicyclo[4.2.0]octan-7-ol, as prepared in Example 5, and 100 ml. of toluene was refluxed under a 10-inch packed column equipped with a Dean-Stark tube. Toluene was distilled out until the base heater temperature reached 183° C., then the solution was allowed to reflux. After 12 hours, 17 ml. of water had been removed. The solution was cooled and diluted with benzene. It was washed with sodium bicarbonate solution, then with water and dried over anhydrous magnesium sulfate. The low boiling material was removed under vacuum and the residue was distilled in a molecular still to give 181 g. (78%) of azelaic acid, bis(8,8 - dimethyl - 2 - oxa - bicyclo[4.2.0]octan - 7 - ol ester, boiling point 120–129° C. (15μ), $n_D^{20}$ —1.4833. *Analysis.*—Calculated for $C_{27}H_{44}O_6$: C, 69.9; H, 9.5; sapon. equiv., 232. Found: C, 69.4; H, 9.3; sapon. equiv., 232.

Example 7

Sixty parts of polyvinyl chloride and 40 parts of azelaic acid, bis(8,8-dimethyl-2-oxa-bicyclo[4.2.0]octan-7-ol)ester, as prepared in Example 6, were mixed on hot rolls, and the mixture was extruded to give a sheet 0.006 inch in thickness. This sheet was quite strong and flexible and it showed substantially no loss of plasticizer when exposed to soapy water for 96 hours. There was also very little loss of plasticizer when the film was heated at 100° C. for 24 hours.

Example 8

A solution of 77 g. (0.5 mole) of 2-oxa-8,8-dimethyl-bicyclo[4.2.0]octan-7-one, as prepared in Example 1, 21.6 g. (0.2 mole) of p-phenylenediamine, and 0.5 g. of p-toluenesulfonic acid in 250 ml. of toluene was refluxed for 12 hours under a 10-inch column equipped with a Dean-Stark tube. A total of 6.5 ml. of water was removed. Upon cooling, a yellow solid precipitated. This was isolated by filtration and weighed 42.3 g. Recrystallization from benzene gave product having M.P. 199–201.5° C. *Analysis.*—Calculated for $C_{24}H_{32}N_2O_2$: C, 75.9; H, 8.4; N, 7.4. Found: C, 75.2; H, 9.0; N, 7.4.

Example 9

A solution of 15 g. of the product of Example 8 in 75 ml. of ethanol was hydrogenated over 5 g. of 1% platinum on carbon in a stainless steel autoclave at 160° C. and 1,500 p.s.i. of hydrogen pressure. After the autoclave was cooled and vented, the contents were filtered to remove catalyst. Evaporation of the filtrate yielded a dark, high boiling residue. When 0.01 part of this material was added to 100 parts of cracked gasoline, it was found that the resulting solution had much better resistance to oxidation than did the unmodified gasoline. This test was carried out at 211.6° F. under 100 p.s.i. of oxygen in a stainless steel bomb.

Although the invention has been described in considerable detail with reference to certain preferred embodiments thereof, it will be understood that variations and modifications can be effected within the spirit and scope of the invention as described hereinabove and as defined in the appended claims.

I claim:
1. 2-oxa-8,8-dimethylbicyclo[4.2.0]octan-7-one.
2. 2-oxa-8-ethyl-8-methylbicyclo[4.2.0]octan-7-one.
3. 3 - ethoxy - 2 - oxa - 8,8 - dimethylbicyclo[4.2.0]-octan-7-one.
4. 3 - ethoxy - 2 - oxa - 6,8,8 - trimethylbicyclo[4.2.0] octan-7-one.
5. The method which comprises reacting a dihydropran of the structure:

wherein R is a member of the group consisting of hydrogen and alkyl groups of from 1 to 4 carbon atoms; and $R^1$ is a member of the group consisting of hydrogen, —CHO, and —OR; with a dialkyl ketene of the structure:

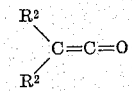

wherein $R^2$ is a member of the group consisting of alkyl groups of from 1 to 4 carbon atoms and alkylene radicals which, together with the carbon atom of the ketene radical to which they are attached, form a carbocyclic ring of 5 to 6 carbon atoms;

6. The method according to claim 5 in which the reaction is carried out at a temperature of 0° to 150° C. in the presence of an inert solvent and employing an excess of the dihydropyran.

7. 2-oxa-8,8-dimethylbicyclo[4.2.0]octan-7-ol.

8. Bis(8,8 - dimethyl - 2 - oxabicyclo[4.2.0]octan-7-yl) azelate.

9. A compound selected from the group consisting of compounds of the formulae:

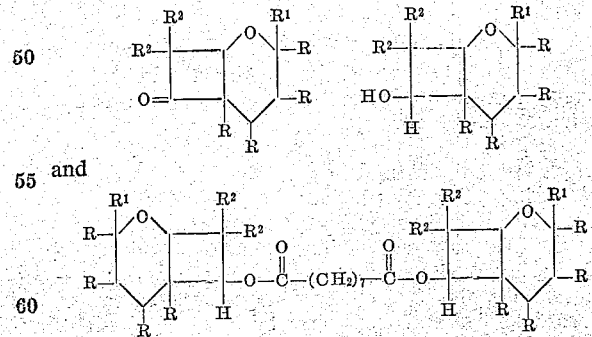

wherein R is a member of the group consisting of hydrogen and alkyl groups of from 1 to 4 carbon atoms; $R^1$ is a member of the group consisting of hydrogen, —CHO, and —OR; and $R^2$ is a member of the group consisting of alkyl groups of from 1 to 4 carbon atoms and alkylene radicals which, together with the carbon atom of the four-member ring to which they are attached, form a saturated carbocyclic ring of 5 to 6 carbon atoms.

References Cited in the file of this patent

Blomquist et al.: Jour. Am. Chem. Soc., volume 73, pages 2098–2100 (1951).